(12) United States Patent
Parthasarathy

(10) Patent No.: US 11,014,829 B2
(45) Date of Patent: May 25, 2021

(54) QUICK RESPONSE, TRANSPORTABLE, STAND-ALONE SYSTEM FOR REMOVING VOLATILE COMPOUNDS FROM CONTAMINATED FLUID STREAMS, AND METHOD OF USE THEREOF

(71) Applicant: WP&E Technologies and Solutions, LCC, Flowery Branch, GA (US)

(72) Inventor: Harikrishnan Parthasarathy, Flowery Branch, GA (US)

(*) Notice: Subject to any disclaimer, the term of this patent is extended or adjusted under 35 U.S.C. 154(b) by 0 days.

(21) Appl. No.: 17/052,175

(22) PCT Filed: Apr. 22, 2020

(86) PCT No.: PCT/US2020/029393
§ 371 (c)(1),
(2) Date: Oct. 30, 2020

(87) PCT Pub. No.: WO2020/219597
PCT Pub. Date: Oct. 29, 2020

(65) Prior Publication Data
US 2021/0087075 A1    Mar. 25, 2021

Related U.S. Application Data

(63) Continuation-in-part of application No. 16/390,973, filed on Apr. 22, 2019, now Pat. No. 10,913,664.

(51) Int. Cl.
*C02F 1/20* (2006.01)
*C02F 1/00* (2006.01)
(Continued)

(52) U.S. Cl.
CPC ............. *C02F 1/20* (2013.01); *B01D 5/0003* (2013.01); *B01D 5/0027* (2013.01); *B01D 5/0069* (2013.01); *B01D 19/0005* (2013.01); *B01D 53/1425* (2013.01); *B01D 53/1487* (2013.01); *B01D 53/1493* (2013.01);
(Continued)

(58) Field of Classification Search
None
See application file for complete search history.

(56) References Cited

U.S. PATENT DOCUMENTS 4,670,278 A    6/1987  Healey
5,069,796 A   12/1991  Fox
(Continued)

*Primary Examiner* — Derek N Mueller
(74) *Attorney, Agent, or Firm* — Carlo Julio Salas Martinez; Smith Tempel Blaha LLC

(57) ABSTRACT

The quick response system and method for removing volatile compounds from contaminated water disclosed herein may comprise, at least, a preconditioning stage, a stripping stage, a condenser stage, a refrigeration stage, and a scrubber stage. The present invention relates to a portable system and method that can be deployed on an emergency or quick response basis to purify aqueous streams containing volatile organic compounds (VOC) and chlorinated hydrocarbons, collectively volatile compounds (VC), emitted from petroleum and chemical processing facilities. The system allows manufacturing facilities having internal cleanup issues to become compliant with environmental standards and guidelines quickly. Once the issues in the petroleum facility are fixed, this method can be demobilized and removed from the site in a short period of time.

19 Claims, 4 Drawing Sheets

(51) Int. Cl.
*B01D 19/00* (2006.01)
*B01D 5/00* (2006.01)
*B01D 53/14* (2006.01)
*C02F 101/32* (2006.01)
*C02F 103/36* (2006.01)

(52) U.S. Cl.
CPC ...... *C02F 1/004* (2013.01); *B01D 2252/2056* (2013.01); *C02F 2101/322* (2013.01); *C02F 2103/365* (2013.01); *C02F 2201/008* (2013.01)

(56) References Cited

U.S. PATENT DOCUMENTS

| | | | |
|---|---|---|---|
| 5,171,334 A | | 12/1992 | Kabis |
| 5,173,092 A | * | 12/1992 | Rudder ................ B01D 3/343 210/747.7 |
| 5,190,668 A | | 3/1993 | Chuang |
| 5,294,303 A | | 3/1994 | Robbins |
| 5,352,335 A | | 10/1994 | Beaver |
| 5,688,076 A | | 11/1997 | Atkins |

* cited by examiner

FIG. 2

QUICK RESPONSE, TRANSPORTABLE, STAND-ALONE SYSTEM FOR REMOVING VOLATILE COMPOUNDS FROM CONTAMINATED FLUID STREAMS, AND METHOD OF USE THEREOF

BACKGROUND OF THE INVENTION

Technical Field

The present invention relates in general to filtration systems, and, more specifically, to a system and method for removing volatile compounds from contaminated air, water, and other industrial emissions.

Prior Art

Volatile compound ("VC") contaminated fluid streams, are generated as a waste product of petroleum or chemical processing and manufacturing facilities. For example, VC contaminated fluid streams are produced from (1) the processing or manufacturing of oil or gas products, (2) the refining of crude, semi-crude, or partially processed oil or gas, (3) the processing or manufacturing of olefins (e.g., cyclic and acyclic alkenes as well as dienes and polyenes, and the like) or the treatment of blowdowns from dilution steam generators or process quench water systems from olefins petrochemical processes, (4) the processing or manufacturing of aromatic compounds, (5) the processing or manufacturing of methyl tert-butyl ether (MTBE) or the treatment of blowdowns and condensates from MTBE dehydrogenation petrochemical processes, (6) the processing or manufacturing of chlorinated hydrocarbons, (7) the treatment of wastewater generated from washdowns and cleaning of reactors, columns, heat-exchanger and product-tanks during planned and unplanned turnarounds in petroleum production facilities, (8) the removal of sulfate, sulfite, and ammonia from produced water streams from oil and gas production, (9) the removal of VC from closed loop cooling water from heat exchanger leaks in petrochemical and petroleum facilities etc.

A variety of VCs are listed as toxic and carcinogenic chemical compounds by the environmental regulatory agencies of various different nations. Often times, these VCs are regulated, when measured as pollutant-discharges to surface waters or air, as hazardous waste. The following Table 1 provides a non-exhaustive list of relevant VCs.

TABLE 1

| | |
|---|---|
| Benzene | Chlorohydrocarbons (VCM EDC, |
| Toluene | DCE, TCE, PERC) |
| Ethylbenzene | Light Phenols |
| Xylenes | Acenaphthenes |
| Acetone | Naphthalenes |
| Gasoline range organics | Diesel Range Organics(< C15) |
| MTBE | Mercaptans |
| Styrene | Other VOC's |
| Butadiene | Short chain Organic and fatty adds |
| Cyclohexane | Other potential VOC's removal: |
| Cyclopentane | Ammonia, H2S, VOC's from spent |
| < C10's | caustic |

For example, petroleum refining involves a number of processes and facilities to convert crude oil into useable products such as petroleum gas, gasoline, kerosene, diesel, etc. Petroleum refineries tend to comprise large industrial complexes having a number of different processing units and support facilities. Often found among these processing units are (1) crude oil distillation units, (2) catalytic reforming units, (3) alkylation units, and (4) various gas treatment units amongst others known to a person having ordinary skill in the art.

The crude oil distillation unit, which is a processing unit common to most petroleum processing facilities, comprises a fractional distillation tower that operates at above atmospheric pressures. The crude oil is heated within this unit and separated, based on boiling points, into various fuels that are further treated in appropriate refining units. Although no waste products are theoretically produced by this distillation process, especially as the materials may be recycled or reprocessed in the refinery, the process of converting crude oil into useable fuels nonetheless still generates a number of products that are harmful to the environment and human health.

A number of environmental impact studies have been conducted into the effects of oil refineries on their locales, all of which tend to determine that such refineries have a negative impact on the air, land, and water in their immediate environment. Air pollution or contaminated gaseous streams (collectively, "gas streams"), for example, may be emitted from the stacks at a refinery or from leaking equipment within the refinery. The land around the refinery may be polluted by the fallout from the air pollution or from any waste generated within the refinery that needs to be disposed of by dumping. Water pollution or contaminated aqueous streams (collectively, "aqueous streams") from refineries, for example, which may be of greatest concern, may be caused by any discharge of chemicals or spilling of oil from the processing or manufacturing facilities, and can have an impact as far as the flow of water can carry the contaminants.

Of primary concern among these various possible pollutants is the emission of VCs; specifically, volatile organic compounds ("VOC"s), or semi-volatile organic compounds ("SVOC"s) (collectively, "VOC"s herein), which are organic chemicals having a high vapor pressure at room temperature and which are, thus, highly volatile, and other non-organic VCs like chlorinated hydrocarbons. For example, benzene, toluene, ethylbenzene, and xylene (collectively, BTEX) amongst other volatile byproducts such as styrene, ammonia, phenols, naphthenics, sulfates and sulfites, etc., are produced by petroleum processing or manufacturing facilities and are commonly found in water in the vicinity of petroleum deposits. The aqueous streams from petroleum processing or manufacturing facilities, in particular, may contain up to about 5000 parts per million concentration by weight of VCs in the aqueous waste stream (ppm) prior to any purification or cleaning attempt.

In addition to the VCs, the aqueous streams also may contain other contaminants like coke or soot, tar, asphaltenes, heavy and light oils, etc., which complicate removal of the VCs from the aqueous stream to meet environmental regulatory standards. These other contaminants may reduce the effectiveness of any prior art purification system or process employed, and increases the cost of treating and discharging the streams released from the facilities.

Benzene, in particular, is a known carcinogen whose concentration in water is highly regulated by various jurisdictions around the world. Australia, for example, requires that benzene not be detectable in water at more than 1 part per billion (ppb). The United States (U.S.) has set the maximum containment level goal for benzene at near zero (0), specifically, 0.057 ppm, although has an enforceable maximum level, considering costs and benefits, of about 5 ppm. For gaseous emissions from non-fully enclosed storage areas, the U.S. has set the active threshold values for BTEX, ammonia, sulfite and sulfate at less than 0.3 ppm.

The VC contaminated streams generated or emitted from chemical processing and manufacturing facilities, therefore, must be purified of BTEX, styrene, chlorinated hydrocarbons, etc. prior to release into the environment. Unfortunately, existing VOC control methods in petroleum processing or manufacturing facilities often consistently and reliably fail to meet environmental standards due to common issues such as (1) mixed contamination complications, (2) facility constraints, (3) operation and management costs, (4) hazardous waste collection and disposal issues, (5) changes in process feed quality conditions, and (6) inefficiencies in the manufacturing process.

One technology commonly used for the removal of various regulated VCs from an aqueous stream is an air stripper. An air stripper utilizes air as a stripping medium to strip VCs from an aqueous stream directed through a tray or packed column, and transfers the VCs from the liquid phase to the gas phase. The exhaust air contaminated with the VCs is then purified to produce a resultant stream with less VCs via treating the resultant stream with thermal oxidation, incinerating, or filtering through activated carbon or zeolite beds.

Another technology commonly used for the removal of VCs from an aqueous stream is the use of carbon and zeolite adsorption media. Such media comprises activated granular or powdered carbon and zeolite media to absorb BTEX, styrene, and chlorinated hydrocarbon from aqueous streams. Such media discharges relatively clean water to the environment. The media has fixed adsorption capacity for the volatile hydrocarbons, and, once the media capacity is exhausted or saturated, it must be replaced with new or reactivated or regenerated carbon or zeolite beds for further use. This technology cannot be utilized as a standalone unit for complex aqueous waste.

Another technology commonly used for the removal of VCs from an aqueous stream is the use of a steam stripper. The process of steam stripping utilizes steam to strip the VCs from the water or liquid phase and transfers the VCs to the steam phase. Higher contact surface areas yields higher efficiency of VC removal from the liquid or water phase into the steam phase. The steam stripper process produces a steam condensate loaded with benzene and volatile hydrocarbons that must be handled separately.

Another technology commonly used for the removal of VCs from an aqueous stream is the use of a nitrogen gas stripper with cryogenic condensation. Such technology is disclosed by U.S. Pat. No. 9,289,697B2, which describes an exemplary system that utilizes a stripping column implementing nitrogen gas for desorption of VCs from an aqueous stream. The resultant aqueous stream is then discharged into the environment per environmental guidelines, while the nitrogen gas loaded with VCs is cryogenically cooled, and the VCs are condensed and separated to meet clean air emission guidelines. Such a process, though, is negatively impacted by the presence of heavier insoluble oils, emulsions, suspended solids, and hydrocarbons in the input contaminated aqueous stream. The process is also highly energy intensive, due to the cryogenic cooling and condensing, resulting in higher energy costs and costs of operation than other prior art systems.

It is, therefore, desirable to overcome the deficiencies of, and provide for improvements to, the state of the prior art. Thus, there is a need in the art for a quick response system and method for removing VCs from a contaminated steam that provides a more efficient and effective system for solving the problems in the art, and that provides a synergist benefit that is more than the sum of the parts of the system.

Accordingly, there is now provided within this disclosure a system and method of use for overcoming the aforementioned difficulties and longstanding problems inherent in the art. A better understanding of the principles and details of the present invention will be evident from the following detailed description.

BRIEF SUMMARY OF THE INVENTION

For one exemplary embodiment, the present invention is directed to a system and an associated method for removal of volatile compounds from oil contaminated water or suspended-solid contaminated water produced as by-product, runoff, or emission from petroleum or chemical manufacturing facilities. The system being a quick response, transportable, and stand-alone system relative to the petroleum or chemical manufacturing facilities.

The system comprises a housing unit or trailer for implementing the system and an input inlet for receiving a contaminated water into the system. The system also comprises a preconditioning subsystem, a stripping subsystem, a compressor, a condensing subsystem, and a scrubbing subsystem. In certain embodiments, the preconditioning subsystem, the stripping subsystem, the compressor, the condensing subsystem, and the scrubbing subsystem may be combined to fit within an enclosed space with a volume no greater than that defined by length dimensions not exceeding about 57 feet, width dimension not exceeding about 9 feet, and a height dimension not exceeding about 12 feet, so as to fit within the trailer The preconditioning subsystem comprises a plurality of filtration and separation media configured to remove particles and debris from the contaminated water. The stripping subsystem is configured to receive the preconditioned water and configured as a multi-tray gas-liquid contactor comprising a blower, a cooling subsystem, and an air or inert gas stripping medium.

The blower of the stripping subsystem is for targeted and adjustable gas-flow rate and gas-pressure. The multi-tray gas-liquid contactor has an enclosed space with volume no greater than that defined by side-length dimensions not exceeding about 57 feet and a height dimension not exceeding about 12 feet, also to fit within a trailer. In certain embodiments, the width dimension does not exceed about 9 feet. In this way, the surface area of gas-liquid contact within the multi-tray contactor is densely packed within the enclosed area of the stripping subsystem. Further, the air or inert gas stripping medium within the stripping subsystem is cooled and pumped counter-current through the multi-tray contactor, such that vapor liquid mass transfer of the VCs occurs as between the preconditioned water and an exhaust air. This concentrates the transferred VCs in the exhaust air and yields a decontaminated water stream.

The compressor is configured as a booster blower for accelerating, or at least maintaining, the target gas-flow rate of the exhaust air as it flows out of the multi-tray contactor of the stripping subsystem and through the remainder of the overall system.

The condenser subsystem is configured to receive the exhaust air from the stripping subsystem and configured to cool the exhaust air via an air-cooled or water-cooled, indirect or direct, refrigeration sub-system. The exhaust gas is passed through the condenser subsystem and cooled such that condensable VCs concentrated in the exhaust gas separate out from the cooled exhaust gas.

The scrubber subsystem is configured to receive the cooled exhaust gas from the condenser subsystem. The scrubber subsystem also is configured as a multi-pack gas-liquid contactor comprising a scrubbing solvent through which the cooled exhaust gas is percolated. In certain embodiments, the scrubbing solvent is selected from a group consisting of low sulfur diesel, kerosene, jet fuel, dipentenes, biodiesel, vegetable oil, oils with alkyl esters, oils from citrus fruit peels, inorganic solvents, or any combination thereof. The cooled exhaust gas is forced through or into contact with the scrubbing solvent within the scrubbing subsystem such that the VCs remaining in the cooled exhaust gas are concentrated in the scrubbing solvent to yield a decontaminated air.

For another exemplary embodiment, the present invention also is directed to a system for removal of VCs from oil contaminated water or suspended-solid contaminated water produced as by-product, runoff, or emission from petroleum or chemical manufacturing facilities. In certain embodiments the system is transportable but may be permanently integrated into a petroleum or chemical manufacturing facility.

The system is substantially the same as the preceding exemplary embodiment summarized herein except for the following differences. The preconditioning subsystem is not limited to a plurality of filtration and separation media; instead, as is described herein, a series of baffles and a coalescer or equivalent may be employed to remove suspended-particles and debris from the contaminated water.

The stripping subsystem, also configured to receive the preconditioned water and configured as a multi-tray gas-liquid contactor, relies on air as the stripping medium. In this embodiment, however, the multi-tray gas-liquid contactor is defined by a ratio of air stripping medium to preconditioned water of between about 4:1 to about 1000:1.

The scrubbing subsystem, also configured to receive the cooled exhaust air from the condensing subsystem and configured as a gas-liquid contactor comprising a scrubbing solvent, relies on a scrubbing solvent selected from a group consisting of low sulfur diesel, kerosene, jet fuel, dipentenes, biodiesel, vegetable oil, oils with alkyl esters, oils from citrus fruit peels, inorganic solvents, and also caustic or alkali solvents, potassium hydroxide, sodium hydroxide, or other hydroxide solvents, or any combination thereof.

If the target compounds in the cooled exhaust air are BTEX and/or chlorinated compounds, for example, then a biodiesel scrubber solvent in the scrubbing subsystem exhibits the required scrubbing efficiency to meet final exhaust VC emission limits of about 0.24 ppm or less (>99.99%). If the target compounds in the cooled exhaust air 14 is $H_2S$, then a 25% caustic scrubbing solution exhibit near complete removal of $H_2S$ (>99.999%). If the target compounds in the cooled exhaust air is iodine, then a 10-50% potassium hydroxide, sodium hydroxide solution, or vegetable oil scrubbing solution as solvent exhibit near complete removal of iodine (>99.999%). Other embodiments and variations and envisioned and possible within the scope of this disclosure.

In its various embodiments, the present invention currently is the only known solution that can treat all the VC contaminated streams from all sources mentioned herein.

BRIEF DESCRIPTION OF THE DRAWINGS

In the figures, like reference numbers refer to like parts throughout the various views unless otherwise indicated. For reference numbers with letter character designations such as "102A" or "102B", the letter character designations may differentiate two like parts or elements present in the same figure. Letter character designations for reference numbers may be omitted when it is intended that a reference numeral to encompass all parts having the same reference number in all figures.

FIG. 2 is listing of the lower and upper explosive limits for flammable gases and vapors, with all concentrations in percent by volume.

DETAILED DESCRIPTION OF THE INVENTION

Figure 1:
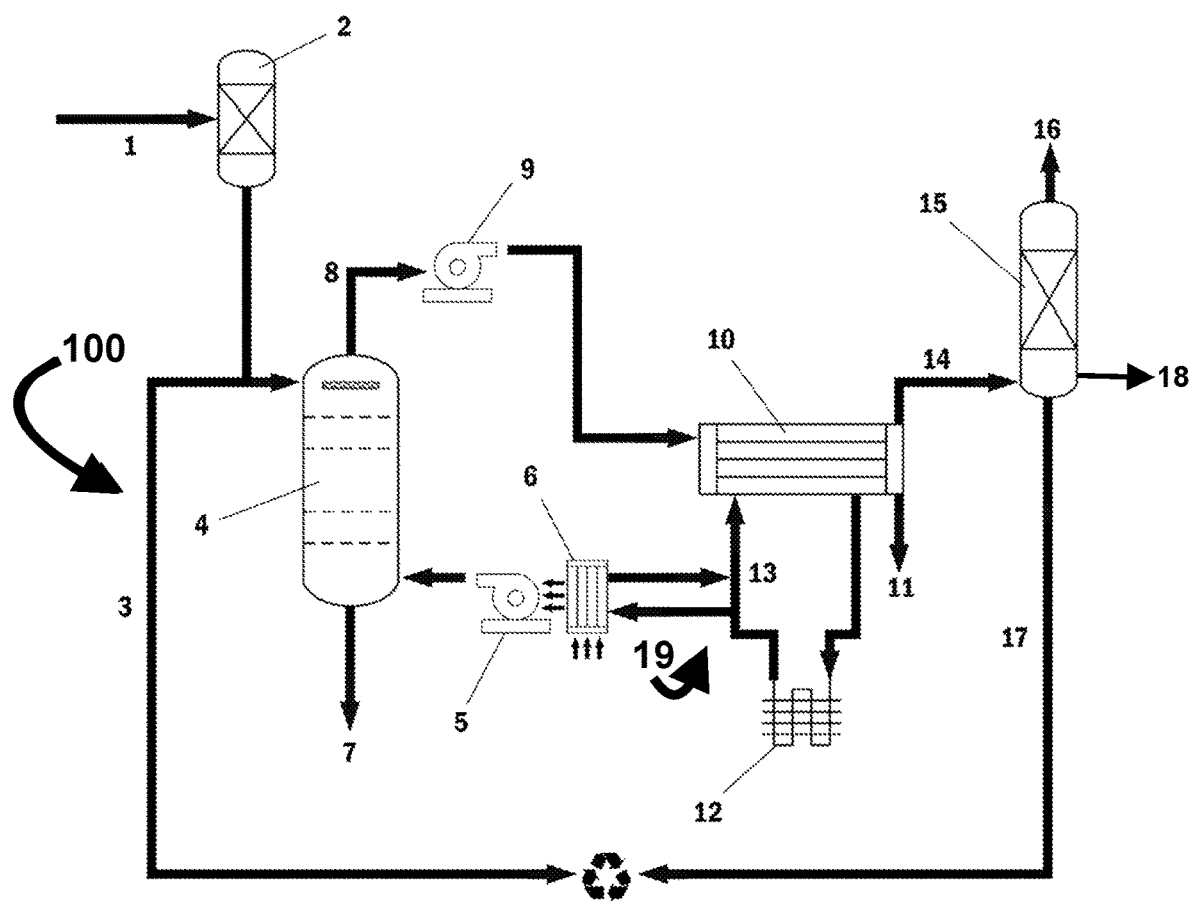
FIG. 1 is a schematic diagram of an exemplary embodiment of a quick response system for removing VCs from a contaminated aqueous stream.

For a further understanding of the nature, function, and objects of the present invention, reference should now be made to the following detailed description taken in conjunction with the accompanying drawings. While detailed descriptions of the preferred embodiments are provided herein, as well as the best mode of carrying out and employing the present invention, it is to be understood that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure, or manner. The practice of the present invention is illustrated by the included Example, which is deemed illustrative of both the process taught by the present invention and of the results yielded in accordance with the present invention.

As used herein, the word "exemplary" or "illustrative" means "serving as an example, instance, or illustration." Any implementation described herein as "exemplary" or "illustrative" is not necessarily to be construed as preferred or advantageous over other implementations.

Embodiments and aspects of the present invention provide an efficient, effective, and economical filtration system for removing VCs from contaminated air emissions or possible air pollutants, water emissions or possible water pollutants, and other industrial emissions. The inventive concepts described herein provide a solution that is intended for the recycling and/or reuse of a low total-dissolved or suspended-solid aqueous streams or high total-dissolved or suspended-solid aqueous streams (e.g., produced water, process waste water, process cooling water, ground water remediation). The inventive concepts described herein also provide a solution that is not susceptible to the limitations and deficiencies of the prior art. Further, the inventive concepts described herein lessen the operating-costs, capital expenditures, and/or infrastructure that is needed to abide by environmental regulations in numerous jurisdictions and nations.

As further background and context, the prior art is legion with limitations and deficiencies. Air strippers, for example, commonly are used for the removal of certain VCs from an aqueous stream. Air strippers and associated methods of use are notoriously expensive. Often times, it is not feasible to employ and use air strippers if the inlet aqueous stream has a high hydrocarbon load.

Air strippers also suffer from an inability or difficulty to connect with a pre-existing incinerator(s) or flare(s). They also are unreliable if the aqueous stream readily releases water or moisture, or carries a high temperature. The exhaust from an air stripper has moisture content which pose performance issues for incinerators, thermal oxidizers, or flares. The exhaust of the air stripper may add tremendous vapor-load to pre-existing incinerators, thermal oxidizers, or flares, which limits the application of air stripper technology.

Air strippers also suffer from difficulties handling inlet aqueous streams loaded with oils or suspended-solid. The presence of oils, and dissolved and suspended-solids, cause fouling of surface-areas on the related trays and/or packings of the strippers. This reduces VC removal efficiency. Further, air stripper efficiency decreases relative to ambient temperature increases starting at about 85.0 degrees Fahrenheit (F) and up, due to decreases in air density. Therefore, more volume of air is needed to compensate for the lower air density, especially during warmer months, or when ambient temperatures are above about 85.0 degrees F.

Further, the pollution from the aqueous stream is merely transferred from the aqueous phase to the air or gas phase when using an air stripper. The exhaust air from the air stripper is laden with VCs that also need to be purified prior to release or venting into the environment, as per common environmental air-emission regulations. In the prior art, the exhaust phase laden with VCs typically is processed via thermal oxidation or incineration, or sent to a flare(s) and/or adsorptio in a vapor-phase activated carbon or zeolite bed to remove VCs from the air to be vented. A person having ordinary skill in the art understands that this type of processing results in other types of pollution. For example, connecting the air stripper exhaust to a vapor phase carbon bed results in (1) a highly hazardous solid waste, (2) makes for unsafe operations, and (3) incurs prohibitive operating cost and capital expenditures.

Next, carbon and zeolite adsorption media also is commonly used for the removal of certain VCs from an aqueous stream. Carbon and zeolite adsorption media and associated methods of use are notoriously expensive, have a high lifecycle cost, are unreliable, frequently need replacement components, and carry a high risk of injury and health issues due to service operations for benzene and VOC vapor management. This is especially true when carbon and zeolite adsorption media are applied to aqueous streams with oils, coke, suspended solids, or with high inlet loadings in the range of about 5000 ppm in the aqueous waste stream.

Like air strippers, carbon and zeolite adsorption media suffer from difficulties handling inlet aqueous streams loaded with oils and suspended solid. Oil, suspended solids, and heavy hydrocarbons may foul the carbon and zeolite media if they also are present along with the VCs. As a result, pretreatment for oil, suspended solids, and heavy hydrocarbons is necessary prior to utilizing the carbon and zeolite media technology for VC removal or one risks reduction in the VC removal efficiency. Further, the carbon and zeolite media technology has adsorption and desorption isotherms/efficiency for each type of VC targeted, which means performance efficiency is not reliable and sustainable in the presence of mixed hydrocarbons. For example, carbon and zeolite media technology removal efficiency of one VC like benzene is reduced if chlorinated hydrocarbons also are present in the same aqueous stream.

Carbon and zeolite adsorption media performance also is impacted by the concentration of VCs in the inlet stream. For a fixed amount of media, the higher the concentration of VCs in the aqueous stream, the shorter the life of the media bed and the higher the replacement frequency. Adsorption or removal efficiency of the media also is impacted by temperature and pH variations. A person of ordinary skill in the art understands that the pH and temperature of the carbon and zeolite adsorption media need to be adjusted as per design operation specifications for each type of media. However, at above about 140.0 degrees F., carbon and zeolite adsorption media is not very effective.

For example, the use of carbon and zeolite adsorption media may begin producing a treated aqueous outlet stream with benzene levels that are less than about 0.05 ppm. Unfortunately, the benzene levels of the treated aqueous outlet stream begin to increase from between about 1 ppm to about 20 ppm as the carbon and zeolite beds become saturated and in need of replacement. On average, under the most common use settings, the carbon and zeolite beds demand replacement about every day to about every week depending on the initial VOC concentrations, oil loadings, pH, and temperature, etc. Operating costs may increase from between about 2× to about 10× per month from original estimates simply based on consistent and sustained high VOC loads.

As such, a person having ordinary skill in the art also understands that the use of carbon and zeolite adsorption media results in different types of pollution and chemical waste, for example, spent or exhausted carbon and zeolite adsorption media is a hazardous solid-waste and needs to be disposed carefully as per environmental disposal regulations. More important, large quantities of hazardous waste are generated, as high flow rates and high VC concentrations result in large amounts of hazardous spent components and filters. On average, under the most common use settings, about 1,000 kilograms (kg) to about 10,000 kgs per month of hazardous benzene and other VOC laden carbon and zeolite filter waste are produced by the average prior art system.

Next, steam strippers also are commonly used for the removal of certain VCs from an aqueous stream. Steam stripper technology is not available as a transportable or standalone system. Often times, it is not feasible to employ and use stream strippers if the inlet aqueous stream has a high hydrocarbon-load or high concentration of suspended solids.

Steam strippers also suffer from an inability or difficulty to connect with pre-existing incinerator(s) or flare(s). They also are unreliable if the aqueous stream readily releases water or moisture, or carries a high temperature. The exhaust from a steam stripper like that of an air stripper has moisture content which poses performance issues for incineration, thermal oxidation, or flares. The exhaust of the steam stripper may add tremendous vapor-load to pre-existing incinerators, thermal oxidizers, flares, carbon and zeolite beds, which limits the application of the steam stripper technology.

Steam strippers also suffer from difficulties handling inlet aqueous streams loaded with oils and suspended-solid. As is the case for air strippers, the presence of oils, and dissolved and suspended-solids, cause fouling of surface-areas on the related trays and/or packings. This reduces VC removal efficiency and reduces the flow rate of the system.

Further, the pollution from the aqueous stream is merely transferred from the aqueous phase to the steam phase when using a steam stripper. The steam, therefore, must be condensed by a condenser, and the remaining VCs in the steam must be captured prior, to venting of the steam into the environment. The exhaust steam laden with the VCs, therefore, requires processing via thermal oxidation or incineration, or adsorption via activated carbon or zeolite beds. The condensate generated from steam condensing contains high concentrations of VCs and must be disposed of as hazardous liquid waste. Unfortunately, connecting the steam stripper exhaust to carbon and zeolite adsorption beds generates highly hazardous solid-waste material, makes it unsafe for operations, and incurs prohibitive operating expenses to implement.

Next, nitrogen gas strippers with cryogenic condensation also are commonly used for the removal of certain VCs from an aqueous stream. Like the other technologies mentioned, nitrogen gas stripper performance is negatively impacted by the presence of heavier insoluble oils, emulsions, suspended solids, and hydrocarbons in the aqueous stream. Like air strippers and carbon and zeolite adsorption media, nitrogen gas strippers with cryogenic condensation are notoriously expensive, due to cryogenic temperature cooling/condensing, and therefore have a high lifecycle cost.

Nitrogen gas strippers with cryogenic condensation suffer from difficulties handling inlet aqueous streams with VC concentrations higher than about 500 ppm or about 0.05% by weight of VOCs/VCs. A person having ordinary skill in the art understands that nitrogen gas strippers with cryogenic condensation are primarily applicable for clean ground water applications; ideally, for targeting a single type of VC in water with a similar range of melting temperatures. Nitrogen gas strippers with cryogenic condensation are not intended or designed, for example, for petroleum industry facility-generated-wastewater, due to the complexity of the aqueous waste stream and the presence of oils, coke, suspended solids, etc. The reason being that cryogenic condensation causes phase separation issues when a mixture of VCs are being processed. Further, desorption occurs when a mixture of hydrocarbons is condensed in the separation vessels of the nitrogen gas strippers and, therefore, causes noxious emission issues.

Next, carbon and filter adsorption-based-biological-activated-carbon removal units also are commonly used for the removal of certain VCs from an aqueous stream.

With the above context in mind, a first exemplary embodiment of the present invention provides a system for and a method of removing VCs from VC contaminated fluid streams wherein the relative operating costs do not change based on the VC or VOC load in the streams. In certain instances, the system and method is configured to process VC contaminated air or gas streams. In other instances, the system and method is configured to process VC contaminated water or aqueous streams.

Further, in certain instances, and with an understanding that removal of dissolved organics like BTEX, chlorinated organics, volatile or semi-volatile organic acids, phenols, naphthenic, ammonias, and sulfides, etc., is critical prior to removal of any remaining total dissolved solids (TDS) and metals, the system and method is configured to target VOCs. In other instances, the system and method is configured to target non-organic VCs defined by the group consisting of chlorinated hydrocarbons. In all instances, the system and method yield (1) about 99% lower waste generation than using activated carbon or zeolite filters or transportable systems with activated carbon or zeolite filters, (2) no increase in nitrous oxide emissions (NOx) or sulfur oxide emissions (SOx), (3) valuable collected liquid hydrocarbon or oil byproducts that can be reused or recycled as fuel, and or sold as a product, and (4) at least about 50% lower operating costs than carbon or zeolite filtration.

A second exemplary embodiment of the present invention provides a transportable and/or stand-alone system, and associated method, that can be deployed on an emergency or quick response basis to purify VC contaminated fluid streams emitted from petroleum or chemical processing and/or manufacturing facilities. In certain instances, the system and method is configured for the removal of VCs from oil contaminated water and/or suspended-solid contaminated water produced as a by-product, runoff, and/or emission from petroleum or chemical processing or manufacturing facilities. In other instances, the system and method is configured to substantially purify, or nearly-completely purify, VC contaminated aqueous streams emulsified, or partially emulsified, with heavy and/or light oils and/or other commonly associated suspended-solids likes coke, soot, tar, asphaltenes, etc. In other instances, the system and method is configured to substantially purify gaseous streams vented from non-fully enclosed gas storage areas, tank vents, evaporation ponds, surge pits, wastewater basins, etc.

A third exemplary embodiment of the present invention provides a transportable, stand-alone system, and associated method, configured to be mounted on a trailer or skids that can be deployed on an emergency or quick response basis, to purify VC contaminated fluid streams. The system and method allows chemical processing and manufacturing facilities, having internal cleanup issues, to quickly become compliant with environmental standards and guidelines. Once the issues in the petroleum facility are fixed, the system and method may be remobilized and removed from the site in a short period of time. The system also easily may be remobilized or ramped up within a short period of time, as needed.

A fourth exemplary embodiment of the present invention provides a standalone, continuous, and single-pass system for an aqueous stream with BTEX, styrene, ethyl benzene, and chlorinated hydrocarbon contamination as high as about 5000 ppm each, or even as high as 30,000 ppm each. The system comprises a preconditioner, a VC stripper, a dense-air injector, a pressure booster blower, a condenser, and a vapor scrubber, and provides the synergistic benefit described herein, in a transportable structural configuration, for mounting on a standard semi-trailer(s) for highway transport. The system may be deployed on an emergency or quick response basis for purification of up to about 99.99% of BTEX, styrene, and chlorinated hydrocarbons in an aqueous stream. The system does not need to be connected to the flare, incinerator, thermal oxidizer, or carbon filter of a pre-structured petroleum or chemical processing or manufacturing facility.

In certain instances, the system yields a resultant or output aqueous stream defined by between about 0.01 ppm to about 0.24 ppm VOC levels. In certain instances, the system yields a resultant or output aqueous stream with benzene levels of about 0.05 ppm or lower, toluene levels of about 0.02 ppm or lower, ethyl benzene levels of about 0.142 ppm of lower, styrene levels of about 0.5 ppm or lower, and chlorinated hydrocarbon levels of about 0.5 ppm or lower.

A fifth exemplary embodiment of the present invention provides a standalone, transportable, modular (for scaling up or ramping down operations, as needed), turnkey, integrated extraction and scrubbing system, and associated method, for removing VCs from VC contaminated fluid streams, wherein the contamination is as high as about 32,000 ppm per chemical type. The system is configured to purify aqueous streams, and/or gaseous streams vented from non-fully enclosed gas storage areas or tank-vents with VOC levels as high as about 32,000 ppm, ammonia levels as high as about 990 ppm, methylamine levels as high as about 1,100 ppm, and sulfur levels as high as about 10,000 ppm. Depending on the circumstances, the requisite number of modular system units may be deployed on an emergency or quick response basis to yield a resultant or output aqueous stream defined from between about 0.01 ppm to about 0.24 ppm VOCs/SVOCs levels.

In certain instances, the system yields a resultant or output gaseous stream with active threshold VOC levels, benzene levels, ammonia levels, sulfate levels, etc. of less than about 0.3 ppm. In other instances, the system yields a resultant or output gaseous stream with benzene levels at about 0.009 ppm and total other VOC levels at about 0.24 ppm. Further, in certain instances, the system yields degassing down to about 10% lower explosive limit (LEL) or lower, and results in significant odor control for surrounding areas.

With the above background and context in mind, embodiments and aspects of the present invention become apparent from the drawings and the following detailed description.

FIG. 1 is a schematic diagram of a sixth exemplary embodiment of the present invention. FIG. 1 illustrates a quick response system 100, and associated method, for removing VCs from a contaminated aqueous stream. The system 100 is a standalone treatment unit that does not need to be connected to a pre-existing facility flare, incinerator, or thermal oxidizer. The system 100 presents a lower overall cost than alternate options for purifying an aqueous stream contaminated with BTEX, styrene, chlorinated hydrocarbons, oils, suspended-solids, varying pH levels (of between about 2 to about 14), and varying temperature (of between about 33.0 degrees F. to about 212.0 degrees F.), to yield an output stream with about 0.05 ppm levels of benzene of lower, about 0.02 ppm toluene or lower, about 0.142 ppm ethylbenzene or lower, about 0.5 ppm styrene or lower and about 0.05 ppm of chlorinated hydrocarbons or lower, even at high inlet concentrations of up to about 5000 ppm.

The system 100 also has 95% lower waste generation side effects than using an integrated activated carbon filter. The system 100 does not increase NOx or SOx emissions and also produces valuable liquid hydrocarbon oil byproducts that can be reused (e.g., reused in the system 100).

In more detail, the quick response, transportable, standalone system 100 is installed onto a skid, or related skids, as a foundation for the heavy machinery. A person having ordinary skill in the art understands that skids have no bottom deck boards and therefore offers less friction, which makes the skid(s) like a sled and relatively easier to drag than standard pallets or crates, etc. and to load/unload from standard transportation vehicles or machinery. Subsystems of the system 100 may be installed on their own skid(s), all to be incorporated together as the system 100.

The system 100 with the foundational skid(s), for example, is configured to be loaded/unloaded, with a standard fork lift, and mounted onto/dismounted from a standard semi-trailer, which is a trailer without a front axle intended to be pulled by a tractor unit on the U.S. highway system and under standard minimal clearances of no more than about 12 feet. By way of further example, a semi-trailer in the U.S. may be a box trailer having an enclosed rectangular area usually of about 45 feet to about 53 feet in length, though they can range from about 28 feet to about 57 feet. In another non-limiting example, the semi-trailer may comprise a proprietary design and the entirety of the system 100 is contained within or on such a trailer device. The system 100 may be pulled to a location where the system 100 ought be implemented, and removed from the location when the system 100 is no longer needed.

The skid(s), holding the quick response system 100, is/are configured to be placed alongside a stream, a stream conduit, or other receptacle or body of water contaminated with VCs. An appropriate means for diverting water into the system 100, such as an input inlet pipe or feed ramp, may be placed into the conduit or body of water. The means for diverting water may operate by allowing the force or movement of the water to push contaminated water into the system 100 via the input inlet, for example, or may further comprise a fluid pump for forcing water into the system 100. The contaminated water entering the system is presented by the inlet water 1 herein and throughout.

For purposes of the system 100 and the associated method, the inlet water 1 is fed initially into a preconditioning subsystem 2.

The preconditioning subsystem 2 is skid mounted and comprises a plurality of filtration and separation media for preconditioning of the inlet water 1. The preconditioning subsystem 2 reduces the risk of fouling the subsequent subsystems (described in greater detailer herein) of the system 100, by filtering out large particles and debris not otherwise to be processed by the system 100, and further filters out oil and hydrocarbons 3 not requiring processing or decontamination by the system 100. Such filtered-out oil and hydrocarbons 3 may be mixed with spent scrubbing solvent 17 (described in greater detail herein) discharged by the system 100 for reuse or recycling. The inlet water 1 filtered through the preconditioning subsystem 2 is then sent to a stripping subsystem 4, whereby the action of the preconditioning subsystem 2 prevents the stripping subsystem 4 from experiencing efficiency losses of up to 50%.

In one exemplary embodiment of a preconditioning subsystem 2, an input inlet water 1 or feed liquid stream enters a skid mounted and transportable preconditioning housing unit and subsystem 2. The skid mounted and transportable preconditioning housing unit and subsystem 2 is an equalization stage for the contaminated inlet water 1, and incorporates baffles and filter coalescers to remove sludge, to condition the input inlet water 1, and to protect the downstream VC stripping subsystem 4 from blinding. This stage removes oil and suspended-solids contamination greater than about 100 microns in particle size.

In this exemplary embodiment of the system 100, the pre-conditioned input inlet water is pumped into the downstream VC stripping subsystem 4. The recovered oil, hydrocarbon, and suspended-solid sludge from the preconditioning subsystem 2 is mixed with the spent solvent or oil 17. The stripping subsystem 4 comprises a single pass continuous stripping structure for removing VCs from the preconditioned input inlet water off of the preconditioning subsystem 2. The stripping means may be any means appropriate for the targeted and broad removal of one or more of VCs such as, for example, air or other inert gasses.

The surface area of the stripping means, including the number of trays used, and the form factor of the packaging, may vary based on the characteristics of the preconditioned input inlet water and outlet rates of the particular embodiment. In this way, a smaller stripping subsystem 4 and, thus, a smaller overall system 100, may be used in smaller or less polluted environments while a larger stripping subsystem 4 and, thus, a larger overall system 100, may be used in a more polluted environments.

In one exemplary embodiment of the stripping subsystem 4, wherein the subsystem 4 configured as a multi-tray gas-liquid contactor and wherein the stripping medium used is air, an air pump 5 is used to supply the stripping medium at an appropriate volume, pressure, and rate of flow, which may be measured in cubic feet per minute (cfm). The air pump 5 may further comprise an air intake and cooling subsystem 19, which may facilitate drawing in ambient air, and cooling the air prior to its pumping by the air pump 5. This cooling of the air increases its density and improves the stripping efficiency of the medium against VCs.

A person having ordinary skill in the art understands that a stripping medium pumped at ambient temperatures, between about 80.0 degrees F. to about 110.0 degrees F., is shown to have a cfm rate of about 8% less than air stripping mediums pumped between about 60.0 degrees F. and 70.0 degrees F. Therefore, without the air intake and cooling subsystem 19, the air pump 5 of the stripping subsystem 4 would necessarily have to be a larger or higher capacity pump, having higher maintenance demands, to compensate for the decreased efficiency of the stripping medium. In this way, the air intake and cooling subsystem 19 allows the quick response system 100 and method to retain its efficiency in environments where the ambient temperature is greater than optimal for sourcing the stripping medium.

In another exemplary embodiment of the stripping subsystem 4, wherein the subsystem 4 configured as a multi-tray gas-liquid contactor and wherein the stripping medium used is an inert gas such as, for example, low pressure nitrogen, steam, fuel gas, flue gas, flare gas, or carbon dioxide, the stripping medium may be pre-cooled or may be stored in a separate subsystem for use by the subsystem 4, and may not require an air intake and cooling subsystem 19.

In another exemplary embodiment of the stripping subsystem 4, the maximum height of each stripper is about 9 feet (ft), the maximum width is about 8 ft, and the maximum length is about 10 ft. A person having ordinary skill in the art understands that the maximum height and width correspond to the dimensions that may be transported on a standard U.S. flatbed trailer on the U.S. highway system without special permits and under standard clearances. The stripping subsystem 4 comprises a horizontal tray(s) that are from between about 1 ft to about 10 ft long, based on the throughput capacity needed (total height maximum 9 ft), and defining hundreds of 1 millimeter (mm) to 10 millimeter holes along each tray. The pre-conditioned input inlet water flows from top to bottom across the trays. The liquid is kept within the 1 inch to about 5 inches of depth and the gas is introduced from the bottom.

More specifically, each stripping subsystem 4 comprises between one to six trays. The depth of each tray is about 1 inch to about 10 inches, and overall the trays maintain about a 1 inch to about a 5 inch depth of water column on each tray. The total depth of the water column in a stripping subsystem 4 with six total trays (total height maximum 9 ft) is about 6 inches to about 30 inches. The number of trays, the number of holes in each tray, the length and width of each tray, etc. are dependent on the flow rates or throughput, the desired outlet water concentration of VCs and other contaminants like oil, suspended solids, etc. Because the trays of the stripping subsystem 4 are long, between about 1 ft to about 10 ft long, and about 8 feet wide, the ratio of gas supply to water volume treated in the stripping subsystem 4 is between about 10:1 to about 1000:1, as compared to standard air strippers where the air to gas ratio is significantly less.

Returning to the one exemplary embodiment of the stripping subsystem 4 of FIG. 1, wherein the subsystem 4 is configured as a multi-tray gas-liquid contactor and wherein the stripping medium used is air, the air is introduced from the bottom of the stripping subsystem 4 below the last level tray via the air pump 5 at a pressure of between about 1 pound per square inch (psi) to about 2 psi. This high ratio of gas supply to water volume treated ensures there is efficient contact between the gas rising from bottom and the pre-conditioned input inlet water, through the stripping subsystem 4, across the trays in zig-zag fashion, via the hundreds of mm-sized holes, ensuring enough fluidization. With the about 1 psi to about 2 psi total gas inlet pressure and the about 1 inch to about 5 inch water column pressure across each tray, the stripping subsystem 4 ensures (1) control over the extent of fluidization such that there is no foaming, (2) the right ratio of gas feed to water, and (3) that the gas is supplied at a predetermined and targeted mass flow and pressure. The higher the mass of gas introduced within the same volume, at the supply pressure of about 1 psi to about 2 psi plus or minus about 30%, the higher the stripping efficiency of the stripping subsystem 4.

The stripping subsystem 4 additionally comprises the air intake and cooling subsystem 19 including a fresh air intake and compressor cooler 6 with associated heat-pump components such as cooling/heating fluids in conduits 13. The air pump 5 is designed to overcome the about 6 inches to about 30 inches of water column of the multiple trays across the maximum height of the stripping subsystem 4 and still provide the targeted volumetric or mass flow rate of air.

In this way, the intake of ambient air into the stripping subsystem 4, via the air pump 5, may be selectively cooled and used to increase the mass rate of air into the stripping subsystem 4, for improved stripping efficiency. A person having ordinary skill in the art understands that conventional air blowers produce an air supply with about 7% to about 8% less mass rate of air when ambient temperatures are greater than about 85 degrees F. Therefore, there is a need for higher blower capacities to provide the targeted ratio of gas to water without lower discharge pressure.

A person having ordinary skill in the art also understands that, by precooling the intake of ambient air to about 50 degrees F., via the air intake and cooling subsystem 19, especially in a hot ambient environment where ambient temperatures are greater than about 85 degrees F., the density of air taken into the stripping subsystem 4 is increased by about 7% to about 8%. This increase in the mass rate of air allows, even in hot summer months or consistently hot climates, for the use of the same efficient and effective air pump 5 set-up, and in turn, improves the efficiency of the stripping unit 4. This improvement in efficiency is due in part to the increased mass flow rate of air through the mm-sized holes of the stacked trays of the stripping subsystem 4, which improve the vapor liquid mass transfer of the VCs from the pre-conditioned input inlet water to the air phase. The added benefit of the about 7% to about 8% increased mass rate of air also allows for the air pump 5 in the stripping unit 4 to have a reduced size for efficiency, without sacrificing the near 99.99% VC removal effectiveness of the system 100.

Next, the cooled and dense gas/air phase is pumped, at a targeted and adjustable gas flow rate and gas pressure, via the air pump 5, such that the air flows counter-current relative to the VC contaminated aqueous stream and comes into contact with the VC contaminated aqueous stream along the trays or packings of the stripping subsystem 4. In particular, the air phase flows counter-current through the stripper trays or packings and strips the VC compounds from the pre-conditioned input inlet water, as it flows upwards through the trays or packings. The pre-conditioned input inlet water is stripped of the VC compounds as it flows down through the trays or packings.

Next, the VC-loaded air phase exits the stripping subsystem 4 with the help of a compressor configured as a booster blower 9, for accelerating or at least maintaining the targeted gas-flow rate of the VC-loaded air as it is exhausted out of the stripping subsystem 4 and through the remainder of the system 100. The resultant treated and decontaminated aqueous stream 7 experiences a near 99.99% reduction in VC contamination, with environmental discharge objectives of about 0.05 ppm levels of benzene, about 0.02 ppm toluene, about 0.142 ppm ethylbenzene, about 0.5 ppm styrene, and about 0.05 ppm of chlorinated hydrocarbons. Such a decontaminated water stream may be released from the system back into the environment.

The exhaust air 8 from the trays or packing of the stripping subsystem 4 may be passed through a coalescing medium in the stripping subsystem 4 to filter out any remaining moisture in the exhaust air 8 before being sent to a condenser subsystem 10 for further processing.

In one exemplary embodiment of the condenser subsystem 10, the subsystem 10 implements a cooling of the VC loaded exhaust air 8, via an air-cooled or water-cooled, indirect or direct, refrigeration sub-system, which results in an increase in air density and a slowing of air velocity through the condensing subsystem 10. The compressor 9 may be installed in the stream of the VC-loaded exhaust air 8 upstream from the condenser subsystem 10. The compressor 9 may serve to accelerate or to maintain the air flow velocity of the exhaust air 8 through the condenser subsystem 10.

A person having ordinary skill in the art understands that the condenser subsystem 10 may be installed on its on skid for integration with the other skid(s) to form the system 100, and may comprise an air-to-air or air-to-water cooling system such as, for example, an air-cooled radiator or a water-cooled radiator. In any embodiment, the condenser subsystem 10 serves to cool the VC-loaded exhaust air 8 such that the condensable contaminants 11 may be removed from the exhaust air 8 for reuse and/or recycling (via collection, for example).

In another exemplary embodiment of the condensing subsystem 10, the cooling is accomplished by a refrigeration subsystem 12 pumping a cooling fluid through conduits 13 through the condenser subsystem 10. The cooling fluid in the conduits 13 may comprise any appropriate coolant such as, for example, water, propylene glycol, or brine, and may be contained within a closed subsystem of its own. Further, the condenser 10 may transfer heat from the stripping subsystem 4 exhaust air 8 via the cooling fluid in conduits 13, thereby cooling the exhaust air 8 and heating the cooling fluid in conduits 13. In this way, the refrigeration subsystem 12 may then cool the cooling fluid in conduits 13 for reuse. As is previously described, the cooling fluid in conduits 13 also may be used to cool the air as stripping medium via the fresh air intake and compressor cooler 6 and the air pump 5. The refrigeration subsystem 12 may maintain the cooling fluid in conduit 13 at temperatures between about −40.0 degrees F. and about 85.0 degrees F.

In another exemplary embodiment of the condensing subsystem 10, and with more particularity, the VC-loaded exhaust air 8 laden with water droplets passes through a coalesce or demister pad within the stripping subsystem 4, which coalesces the water droplets in the air to ensure low water carryover to the remainder of the system 100. Coming out of the stripping unit 4, the pressure of the VC-loaded exhaust air 8 loses the equivalent of about 12 inches of water column. In certain instances, the pressure of the VC-loaded exhaust air 8 must be boosted from between about 2 psi to about 5 psi such that the condensing subsystem 10 may operate efficiently and effectively.

Coming out of the stripping subsystem 4, the VC-loaded exhaust air, mostly free of water droplets, is pumped via a compressor 9, to accelerate or to maintain the air flow velocity of the exhaust air 8, into a transportable, skid-mounted condensing subsystem 10. Within the condensing subsystem 10, the VC-loaded exhaust air 8 is cooled and condensed to lower the temperature of the air sufficiently to recover and recycle the condensable compounds, including any moisture carryover from the stripping subsystem 4.

The condensing subsystem 10 is a heat pump which experiences from between about 2 psi to about 3 psi of pressure drop. The VC-loaded exhaust air 8 enters and exists cold on one side of the condensing subsystem 10 while the cooling fluid in conduits 13 enters and exits warmer on the other side. A person having ordinary skill in the art understands that, without the compressor 9, the VC-loaded exhaust air 8 would not have sufficient pressure or motive force to overcome the pressure drop of the condensing subsystem 10 and the pressure drop of the downstream scrubbing subsystem 15 (described in greater detail herein).

In another exemplary embodiment of the condensing subsystem 10, and with further particularity, the condensing subsystem 10 is fed by the cooling fluid in conduit 13 derived from a transportable mechanical refrigeration unit 12. A person having ordinary skill in the art understands the mechanical refrigeration unit 12 may use cooling water, glycol, and/or brine or another other cooling or heating fluids depending the heat transfer or cooling capacity needed.

Further, no cryogenic refrigeration is needed or performed; instead, the temperature of the cooling fluid in conduits 13 is greater than about 40.0 degrees F. and may be as high as about 85.0 degrees F. A person having ordinary skill in the art, therefore, understands that the process employed by the condensing subsystem 10 is not as energy intensive as cryogenic refrigeration. Further, the cooling fluid in conduits 13 recirculating, on one side of the heat pump, cools the VC-loaded exhaust air 8 on the other side of the heat pump. A person having ordinary skill in the art, therefore, understands that lowering the temperature of the VC-loaded exhaust air 8 to the desired temperature reduces the condensable load upstream of the scrubbing subsystem 15, and facilitates recovery of potentially valuable hydrocarbons, which may otherwise be collected, processed, and/or distributed as products, and may improve the efficiency of the scrubbing subsystem 15. This also ensures levels for each compound are maintained within about 10% LEL for the specific VC compounds in the VC-loaded air stream 8.

Returning to the one exemplary embodiment of the condensing subsystem 10 of FIG. 1, the cooled exhaust air 14 coming out of the condensing subsystem 10 may, and likely, still contains residual VCs that cannot be discharged into the environment. The cooled exhaust air 14 must therefore be sent to a scrubber subsystem 15 for final processing.

One exemplary embodiment of the scrubber subsystem 15 is installed on its own skid for incorporation with the other skid(s) of the system 100 and utilizes any appropriate solvents for scrubbing VCs from the cooled exhaust air 14. Such solvents may include, for example, organic solvents like low sulfur diesel, kerosene, jet fuel, dipentenes, bio-diesel, vegetable oils, oils with alkyl esters, and oils from citrus fruit peels, inorganic solvents, peroxides, or any combination thereof. The solvent(s) may vary, as needed, based on the desired VC filtration sought, and may be varied based on the needs of the particular environment or cleanup project.

The cooled exhaust air 14 is bubbled through a multi-pack gas-liquid contactor configured as a solvent column embodied by the scrubber subsystem 15. The efficiency of VC removal/scrubbing ranges from between about 60% to about 99.9%, depending on the solvent chosen, the available surface area for scrubbing, the amount of available solvent, the flow rate of the cooled exhaust air 14, the ambient temperatures, and environmental regulations. The solvent in the scrubber subsystem 15 is cooled to improve the efficiency of the solvent scrubbing and to reduce reintroduction of benzene, for example, into the cooled exhaust air 14. The solvent is circulated through spray nozzling within the scrubber subsystem 15, wherein the solvent is sprayed onto the cooled exhaust air 14 bubbling out of the solvent column. A person having ordinary skill in the art understands that this improves the efficiency of the scrubbing and the vapor liquid mass transfer of the VCs into the solvent.

Next, once the cooled exhaust air 14 has been scrubbed, the decontaminated air is vented into the environment as output air 16. The spent solvent 17, which now contains VCs as well as various fuel oils, is recycled by the system 100, used as fuel by the system 100, or mixed with filtered oil and hydrocarbons 3.

In another exemplary embodiment of the scrubbing subsystem 15, and with more particularity, the cooled exhaust air 14 contains residual VCs due to unavoidable re-entrainment of VCs while within and when exiting the condensing subsystem 10. The cooled exhaust air 14, substantially free of condensable compounds, is directed to a solvent scrubber unit 15, which is operated under atmospheric pressure of about 14.7 psi.

The scrubbing subsystem 15 has a maximum length of about 40 ft, maximum width of about 8 ft, and maximum height of about 9 ft. In this way, the scrubbing subsystem 15 is transportable on a flatbed U.S. standard trailer on the U.S. highway system with standard clearances and without special permits. The same dimensions may be true for the entire system 100 or for each individual skid mounted subsystem of the system 100. The scrubbing subsystem 15 also is double walled to protect against any scrubbing solvent leaks. The scrubbing subsystem 15 also does not need any carbon filters or other adsorbent materials to facilitate the scrubbing.

A person having ordinary skill in the art understands that the composition of the scrubbing solvent depends on the nature of the VCs remaining in the cooled exhaust air 14 that are being targeted. The scrubbing solvent may comprise organic solvents like low sulfur diesel, kerosene, jet fuel, dipentenes, biodiesel, vegetable oils, oils with alkyl esters, oils from citrus fruit peels, inorganic solvents, caustic or alkali solvents, hydroxide solvents, etc., or any combination(s) thereof. The solvent scrubs the residual VCs from the cooled exhaust air 14 to yield a substantially decontaminated and clean air or gas, as per environmental emissions specifications and standards, and under LELs.

Specifically, the cooled exhaust air 14 laden with residual VCs enters the bottom of the multi-pack gas-liquid contactor of the scrubbing subsystem 15 at a pressure of between about 1 psi to about 3 psi. The cooled exhaust air 14 bubbles through a scrubbing solvent liquid layer of about 20 inches. The scrubbing subsystem 15 also may have trays where the scrubbing solvent is recirculated by a pump such that the solvent flows counter current from top to bottom while the cooled exhaust air 14 laden with residual VCs flows bottom to top. Once the cooled exhaust air 14 laden with residual VCs bubbles through the static scrubbing solvent liquid layer, the cooled exhaust air 14 rises through the tray(s), also defining hundreds of 3 mm holes. This enables effective contact with the solvent flowing in counter current fashion, which maximizes the contact between the scrubbing solvent and the cooled exhaust air 14 laden with residual VCs.

The resultant treated and decontaminated air 16 experiences a near 99.99% reduction in the residual VC contamination, with environmental discharge objectives of equal to or less than about 0.24 ppm for VCs, and such a decontaminated air or gas stream 16 may be released from the system 100 out into the open environment. For example, if the target compounds in the cooled exhaust air 14 are BTEX and/or chlorinated compounds, then a biodiesel scrubber solvent in the scrubbing subsystem 15 exhibits the required scrubbing efficiency to meet final exhaust VC emission limits of about 0.24 ppm or less (>99.99%). If the target compounds in the cooled exhaust air 14 is $H_2S$, then a 25% caustic scrubbing solution exhibit near complete removal of $H_2S$ (>99.999%). If the target compounds in the cooled exhaust air 14 is iodine, then a 10-50% potassium hydroxide, sodium hydroxide solution, or vegetable oil scrubbing solution as solvent exhibit near complete removal of iodine (>99.999%).

In another exemplary embodiment of the scrubbing subsystem 15, the scrubbing solvent may be cooled using the cooling fluid in conduits 13 to improve the efficiency and effectiveness of the solvent scrubbing and to extend the life of the scrubbing solvent.

In any embodiment of the scrubbing subsystem 15, the decontaminated air 16, free of the VC contamination, based on environmental standards and LEL, is discharged into the open environment. Once the scrubbing solvent is saturated and its useful life is exhausted, the spent scrubbing solvent 18 may be reused or recycled, or processed and distributed as a fuel or hydrocarbon oil offering relatively high BTU/heat values. Any residual water 17 from the scrubbing subsystem 15 may be recycled or reused by the stripping subsystem 4.

Figure 2:
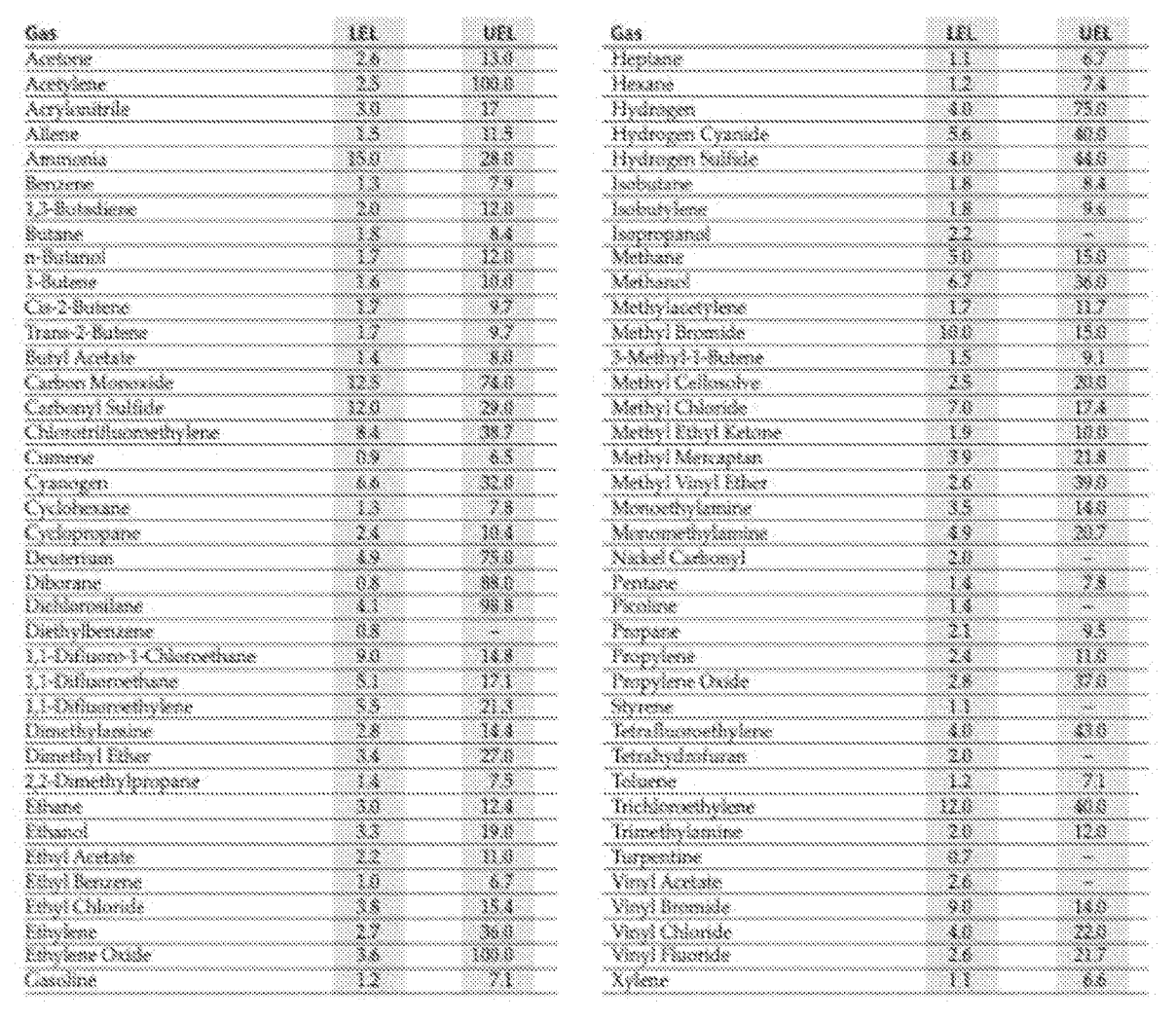

FIG. 2 is a listing of the lower and upper explosive limits for flammable gases and vapors, with all concentrations in percent by volume. The minimum concentration of a particular combustible gas or vapor necessary to support its combustion in air is defined as the LEL for that gas. Below this level, the mixture is too "lean" to burn. The maximum concentration of a gas or vapor that will burn in air is defined as the upper explosive limit. Above this level, the mixture is too "rich" to burn. The range between the LEL and the upper explosive limit is known as the flammable range for that gas or vapor. The values shown in FIG. 2 are valid for conditions of at about room temperature and atmospheric pressure using a 2-inch tube with spark ignition.

Figure 3:
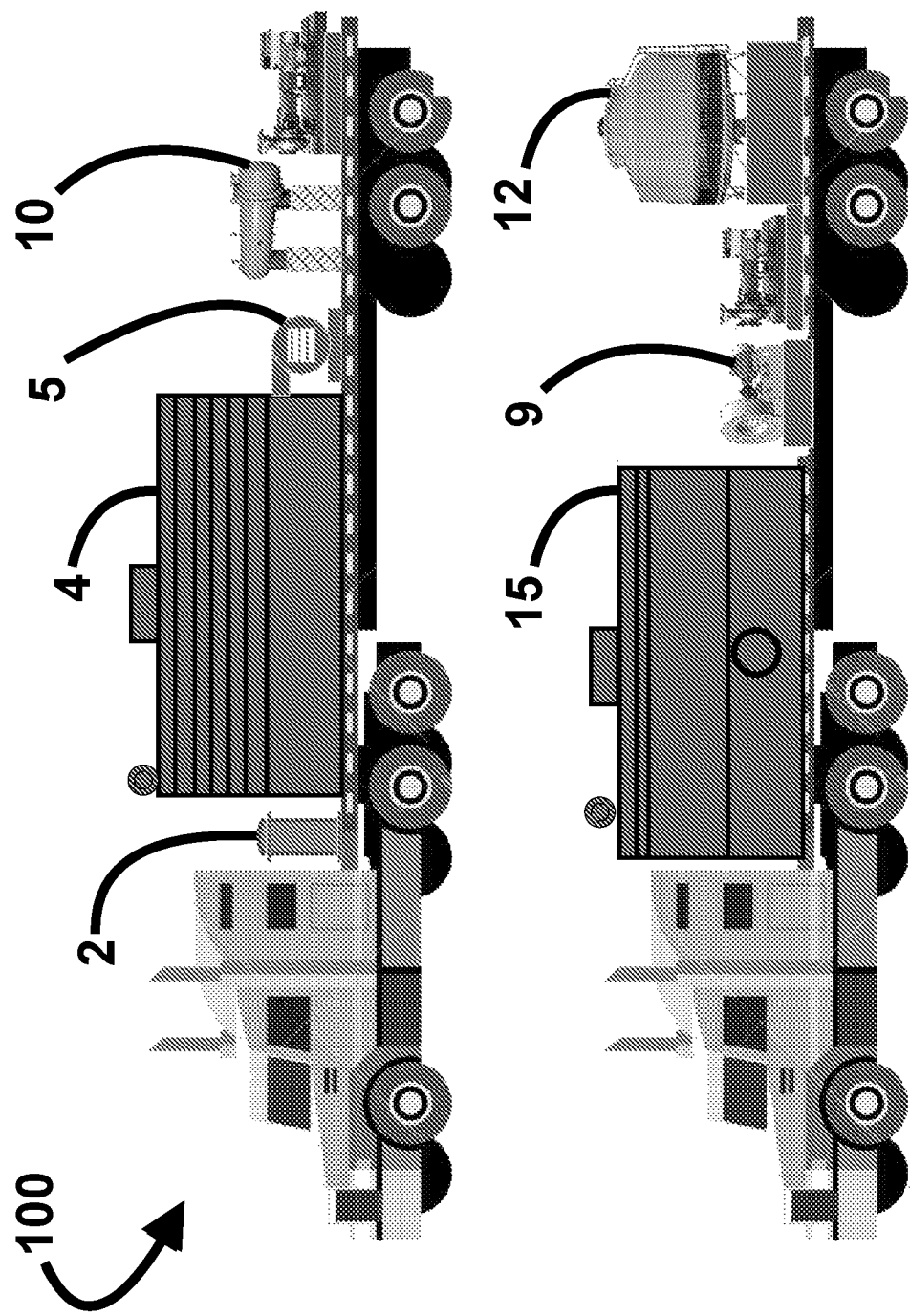
FIG. 3. is a side plan view of the exemplary embodiment of a quick response system of FIG. 1 mounted on two separate tractor-trailers for transport.

FIG. 3. is a side plan view of the exemplary embodiment of a quick response system of FIG. 1 mounted on two separate tractor-trailers for transport. Each trailer is about 48 feet long and about 9 feet wide. Each subsystem of the system 100 is mounted on its own skid. Half of the subsystems are on a first tractor-trailer, and the other half of the subsystems are on a second tractor-trailer.

The system 100 with the foundational skids is configured to be loaded/unloaded, with a standard fork lift, and mounted onto/dismounted from the trailers. The system 100 may be pulled to a location where the system 100 ought be implemented, and removed from the location when the system 100 is no longer needed. The system 100 may be installed and made ready for operations once it arrives at the proper location.

Figure 4:
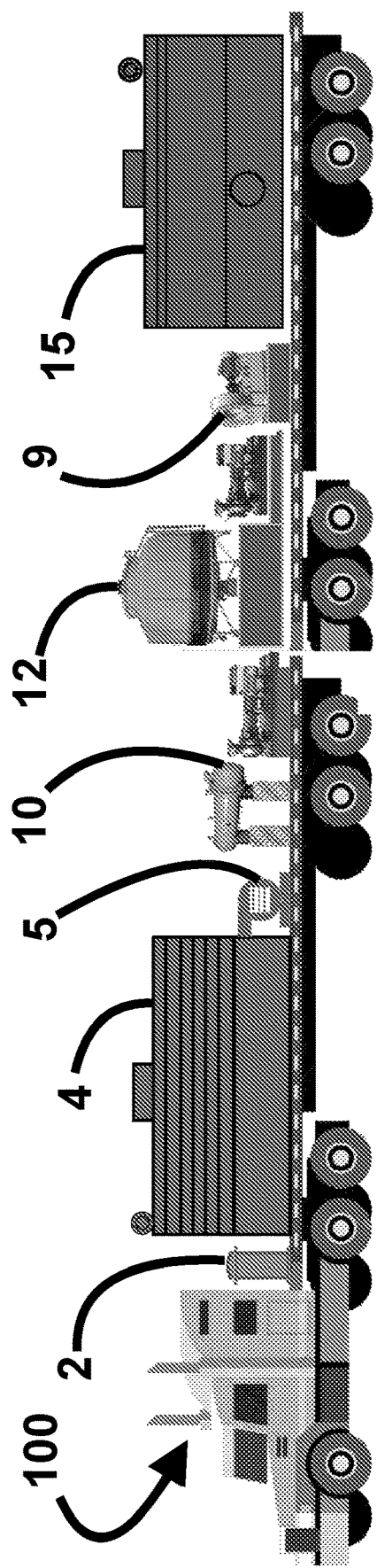
FIG. 4. is a side plan view of an exemplary embodiment of a quick response system of FIG. 1 mounted on two separate linked trailers, but transported by the same tractor, and ready for operations upon arrival.

FIG. 4. is a side plan view of the exemplary embodiment of a quick response system of FIG. 1 mounted on two separate linked trailers, but transported by the same tractor. The system 100 is pre-linked and coupled together, and ready for operations upon arrival. The trailers are substantially the same as those of FIG. 3.

The system 100 even with the foundational skids is configured to be left mounted the trailers during operations for efficiency. Again, the system 100 may be pulled to a location where the system 100 ought be implemented, and removed from the location when the system 100 is no longer needed.

Example

The following is a non-limiting illustrative example of the present invention when applied under experimental conditions in a quick response capacity for a contaminated aqueous stream.

The quick response system used has a flow capacity of about 100 cubic meters per hour ($m^3/h$). The total power needed for the quick response system is less than about 50 amps at 480 V, 3 phase, 60 Hz. A person having ordinary skill in the art understands that this is about 90% less total power than prior art flare, incinerator, thermal oxidizer, or cryogenic refrigeration systems for the same flow capacity and efficiency. The total 20-year lifecycle cost for the quick response system is between about $0.01/$m^3$ to about $0.051 $m^3$ of VC laden water treated, when the system is run 24 hours a day and 7 days a week, and when operations yield both gaseous and aqueous discharges well below LEL for all contaminants measured. A person having ordinary skill in the art understands that the total 20-year lifecycle cost for prior art systems is between about $0.50/$m^3$ to about $20/$m^3$ of VC laden water treated under the same conditions.

The inlet water fed into the preconditioning subsystem is defined by the following parameters. The inlet water has a temperature that ranges from between about 33.0 degrees F. to about 212.0 degrees F. The inlet water has a total VC load that ranges from between about 1 ppm to about 5000 ppm. The inlet water has a pH that ranges from between about 2 to about 14. The inlet water also is contaminated with free oils and suspended-solids (e.g., oils, tar, coke with concentrations as high as 5000 ppm) that range in size from between about 50 microns to about 1000 microns in droplet/particulate size.

The pre-conditioned input inlet water, coming out of the preconditioning subsystem, and pumped into the stripping subsystem is defined by the following parameters. The pre-conditioned input inlet water still has a temperature that ranges from between about 33.0 degrees F. to about 212.0 degrees F. The pre-conditioned input inlet water still has a total VC load that ranges from between about 1 ppm to about 5000 ppm. The pre-conditioned input inlet water still has a pH that range from between about 2 to about 14. However, the pre-conditioned input inlet water now only is contaminated with free oils and suspended-solids that have a droplet/particulate size less than about 100 microns.

Further, the pre-conditioned input inlet water has a flow of about 100 $m^3/h$. The air stripping medium has a flow, propelled by the air pump of the stripping subsystem, of about 4000 cfm at about 1 psi, characterized by a 267:1 ratio of air flow to water flow through the multi-tray gas-liquid contractor structure of the stripping subsystem. The air pump also draws in ambient air with temperatures ranging between about 90.0 degrees F. to about 100.0 degrees F., for cooling the air stripping medium to temperatures less than about 70.0 degrees F., via inlet air cooling, prior to further pumping of the air stripping medium by the air pump. This cooling of the air stripping medium via the air intake and cooling subsystem of the stripping subsystem increases its density and improves the stripping efficiency of the medium.

The decontaminated water coming out of the stripping subsystem is defined by the following parameters. The decontaminated water has a temperature that is as low as about 148.0 degrees F., when inlet waters enter at temperatures as high as about 212.0 degrees F., and this is due to cooling from air-to-water contact in the stripping subsystem. The decontaminated water has experienced about 99.99% removal of benzene, toluene, ethyl benzene, styrene, and chlorinated hydrocarbons. The decontaminated water still has a pH that ranges from between about 2 to about 14.

The exhaust air, coming out of the stripping subsystem, and pumped into the condensing subsystem via the compressor is defined by the following parameters. The exhaust air has a flow, entering the compressor, of about 4000 cfm at less than or about 1 psi. The exhaust air has a flow, propelled by the compressor and coming out of the compressor, of about 4000 cfm at about 5 psi. The exhaust air coming out of the compressor has a temperature that ranges between about 90.0 degrees F. and about 148.0 degrees F., due to heat transfer from the compressor. The exhaust air has a total VC load that is as high as about 11,225 ppm for benzene, toluene, ethyl benzene, styrene, or chlorinated hydrocarbons.

The cooled exhaust air, coming out of the condensing subsystem, and pumped into the scrubbing subsystem via the compressor is defined by the following parameters. The cooled exhaust air has a flow, entering the scrubbing subsystem, of about 4000 cfm at greater than or about 3 psi, due to some inherent pressure lose. The cooled exhaust air has a temperature that ranges between about −25.0 degrees F. to about 40.0 degrees F. The cooled exhaust air has a total VC load that is less than about 600 ppm for benzene, toluene, ethyl benzene, styrene, or chlorinated hydrocarbons.

The condensable contaminant coming out of the condensing subsystem and redirected for reuse or recycling is defined by the following parameters. The condensable contaminant primarily is a condensed hydrocarbon product and water with a hydrocarbon concentration of about 9 grams per million. The solvent with the condensable contaminant is defined as low sulfur petroleum distillate fuel. The condensable contaminant has a temperature that ranges between about 40.0 degrees F. to about 70.0 degrees F.

The decontaminated air coming out of the scrubbing subsystem is defined by the following parameters. The decontaminated air has a flow, exiting the scrubbing subsystem, of about 4000 cfm at less than or about 1 psi. The decontaminated air has a temperature that is less than or about 50.0 degrees F., due to cooling from air-to-water contact in the scrubbing subsystem. The decontaminated air, relative to the exhaust air coming out of the stripping subsystem and entering the scrubbing subsystem, has experienced about 99.99% removal of the residual benzene, toluene, ethyl benzene, styrene, and chlorinated hydrocarbons. The decontaminated air has levels for benzene, toluene, ethyl benzene, styrene, or chlorinated hydrocarbons less than about 0.24 ppm.

The spent scrubbing solvent coming out of the scrubbing subsystem is defined by the following parameters. The spent scrubbing solvent has a temperature that is about 50.0 degrees F. Under typically operating conditions, the total volume of spent scrubbing solvent, in the form of a hydrocarbon product, is between about 4 cubic meters per month (m³/month) to about 6 m³/month. A person having ordinary skill in the art understands that the total volume of spent scrubbing solvent would be greater than about 100 m³/month.

The various embodiments are provided by way of example and are not intended to limit the scope of the disclosure. The described embodiments comprise different features, not all of which are required in all embodiments of the disclosure. Some embodiments of the present disclosure utilize only some of the features or possible combinations of the features. Variations of embodiments of the present disclosure that are described, and embodiments of the present disclosure comprising different combinations of features as noted in the described embodiments, will occur to persons with ordinary skill in the art. It will be appreciated by persons with ordinary skill in the art that the present disclosure is not limited by what has been particularly shown and described herein above.

What is claimed is:

1. A system for removal of volatile compounds from oil contaminated water or suspended-solid contaminated water produced as by-product, runoff, or emission from petroleum or chemical manufacturing facilities, the system being a quick response, transportable, stand-alone system relative to the petroleum or chemical manufacturing facilities, the system comprising:
   a) a trailer for implementing the system;
   b) an input inlet for receiving a contaminated water into the system;
   c) a preconditioning subsystem comprising a plurality of filtration and separation media configured to remove particles and debris from the contaminated water to produce a preconditioned water;
   d) a stripping subsystem configured to receive the preconditioned water and configured as a multi-tray gas-liquid contactor comprising a blower, a cooling subsystem, and an air or inert-gas stripping medium, the blower for targeted and adjustable volumetric flow rate or gas-flow rate, and gas pressure, wherein the multi-tray gas-liquid contactor has an enclosed space with volume no greater than that defined by length dimensions not exceeding about 57 feet, width dimension not exceeding about 9 feet, and a height dimension not exceeding about 12 feet, whereby surface area of gas-liquid contact within the multi-tray contactor is packed within the enclosed space of the stripping subsystem, and wherein the air or inert-gas stripping medium is cooled and pumped counter-current through the multi-tray contactor, such that vapor liquid mass transfer of the volatile compounds occurs between the preconditioned water and an exhaust gas, concentrating the transferred volatile compounds in the exhaust gas and yielding a decontaminated water stream;
   e) a compressor configured as a booster blower for accelerating, or at least maintaining, the target volumetric flow rate or gas-flow rate of the exhaust gas as it flows out of the multi-tray contactor and through the remainder of the system;
   f) a condensing subsystem configured to receive the exhaust gas from the stripping subsystem and configured to cool the exhaust gas via an air-cooled or water-cooled, indirect or direct, refrigeration sub-system, wherein the exhaust gas is passed through the condensing subsystem and cooled such that condensable volatile compounds concentrated in the exhaust gas precipitate out from the cooled exhaust gas; and
   g) a scrubbing subsystem configured to receive the cooled exhaust gas from the condensing subsystem and configured as a gas-liquid contactor comprising a scrubbing solvent through which the cooled exhaust gas is percolated, wherein the cooled exhaust gas is forced through or into contact with the scrubbing solvent such that volatile compounds remaining in the cooled exhaust gas are concentrated in the scrubbing solvent to yield a decontaminated gas;
   wherein the system is mounted onto a skid, or related skids, as foundation for machinery.

2. The system for removal of volatile compounds of claim 1, wherein each of the preconditioning subsystem, the stripping subsystem, the condensing subsystem, and the scrubbing subsystem are mounted onto a skid, or related skids, as foundation for machinery.

3. The system for removal of volatile compounds of claim 1, wherein the particles removed by the preconditioning subsystem comprise oils and hydrocarbons greater than about 100 microns, and wherein the oil and hydrocarbons are diverted for reuse or recycling.

4. The system for removal of volatile compounds of claim 1, wherein the stripping subsystem comprises between two trays to six trays, wherein the depth of each tray is between about 1 inch to about 10 inches, and wherein each tray maintains about a 1 inch to about a 5 inch depth of water column, whereby the total depth of water column in the stripping subsystem is between about 6 inches to about 30 inches.

5. The system for removal of volatile compounds of claim 4, wherein the length of each tray is between about 1 foot to about 10 feet.

6. The system for removal of volatile compounds of claim 5, wherein the stripping medium used in the stripping subsystem is air, and wherein the air is introduced from the bottom of the multi-tray gas-liquid contactor at a pressure of between about 1 pound per square inch to about 2 pounds per square inch.

7. The system for removal of volatile compounds of claim 1, wherein the stripping medium used in the stripping subsystem is air, and wherein the multi-tray gas-liquid contactor is defined by a ratio of air to preconditioned water of between about 4:1 to about 1000:1.

8. The system for removal of volatile compounds of claim 1, wherein the stripping subsystem additionally comprises an air intake and cooling subsystem, and wherein the air intake and cooling subsystem is configured to precool the intake of air to about 50.0 degrees F.

9. The system for removal of volatile compounds of claim 1, wherein the compressor is configured to boost the exhaust gas to between about 2 pounds per square inch to about 5 pounds per square inch.

10. The system for removal of volatile compounds of claim 1, wherein the scrubbing solvent, concentrated in volatile compounds, of the scrubbing subsystem is diverted for reuse or recycling.

11. A system for removal of volatile compounds from oil contaminated water or suspended-solid contaminated water produced as by-product, runoff, or emission from petroleum or chemical manufacturing facilities, the system comprising:
   a) a trailer for implementing the system;
   b) an input inlet for receiving a contaminated water into the system;
   c) a preconditioning subsystem configured to remove suspended-particles and debris from the contaminated water to produce a preconditioned water;

d) a stripping subsystem configured to receive the preconditioned water and configured as a multi-tray gas-liquid contactor comprising a blower, a cooling subsystem, and an air stripping medium, the blower for targeted and adjustable volumetric flow rate or air-flow rate, and air pressure, wherein the multi-tray gas-liquid contactor is defined by a ratio of air stripping medium to preconditioned water of between about 4:1 to about 1000:1, and wherein the air stripping medium is cooled and pumped counter-current through the multi-tray contactor, such that vapor liquid mass transfer of the volatile compounds occurs between the preconditioned water and an exhaust air, concentrating the transferred volatile compounds in the exhaust air and yielding a decontaminated water stream;

e) a compressor configured as a booster blower for accelerating, or at least maintaining, the target volumetric flow rate or air-flow rate of the exhaust air as it flows out of the multi-tray contactor and through the remainder of the system;

f) a condensing subsystem configured to receive the exhaust air from the stripping subsystem and configured to cool the exhaust air via a refrigeration subsystem, wherein the exhaust air is passed through the condensing subsystem and cooled such that condensable volatile compounds concentrated in the exhaust air precipitate out from the cooled exhaust air; and g) a scrubbing subsystem configured to receive the cooled exhaust air from the condensing subsystem and configured as a gas-liquid contactor comprising a scrubbing solvent, the scrubbing solvent selected from a group consisting of low sulfur diesel, kerosene, jet fuel, dipentenes, biodiesel, vegetable oil, oils with alkyl esters, oils from citrus fruit peels, inorganic solvents, caustic or alkali solvents, potassium hydroxide, sodium hydroxide, or other hydroxide solvents, or any combination thereof, wherein the cooled exhaust air is forced through or into contact with the scrubbing solvent such that volatile compounds remaining in the cooled exhaust air are concentrated in the scrubbing solvent to yield a decontaminated air.

12. The system for removal of volatile compounds of claim 11, wherein the system is mounted onto a skid, or related skids, as foundation for machinery.

13. The system for removal of volatile compounds of claim 11, wherein the particles removed by the preconditioning subsystem comprise oils and hydrocarbons greater than about 100 microns, and wherein the oil and hydrocarbons are diverted for reuse or recycling.

14. The system for removal of volatile compounds of claim 11, wherein the stripping subsystem additionally comprises an air intake and cooling subsystem, and wherein the air intake and cooling subsystem is configured to precool the intake of air to about 50.0 degrees F.

15. The system for removal of volatile compounds of claim 11, wherein the scrubbing solvent, concentrated in volatile compounds, of the scrubbing subsystem is diverted for reuse or recycling.

16. The system for removal of volatile compounds of claim 13, wherein the scrubbing solvent, concentrated in volatile compounds, of the scrubbing subsystem is diverted and combined with the oil and hydrocarbons diverted from the stripping subsystem, for reuse or recycling.

17. The system for removal of volatile compounds of claim 16, wherein the scrubbing solvent, concentrated in volatile compounds, is a low sulfur petroleum distillate fuel.

18. The system for removal of volatile compounds of claim 11, with the proviso that the system does not comprise any carbon filters or other adsorbent materials to facilitate scrubbing.

19. The system for removal of volatile compounds of claim 11, with the proviso that the system does not comprise cryogenic refrigeration or equivalent.

* * * * *